United States Patent [19]

Noyes

[11] 4,129,547

[45] Dec. 12, 1978

[54] HIGH SOLIDS COATING COMPOSITIONS FOR FLEXIBLE SUBSTRATES CONTAINING UREA-FORMALDEHYDE

[75] Inventor: Paul R. Noyes, Philadelphia, Pa.

[73] Assignee: E. I. Du Pont de Nemours and Company, Wilmington, Del.

[21] Appl. No.: 811,983

[22] Filed: Jun. 30, 1977

[51] Int. Cl.$^2$ ................................................. C08K 5/05
[52] U.S. Cl. ............................ 260/33.4 R; 106/270; 260/28 R; 260/31.8 R; 428/460; 428/524; 428/528; 428/530; 528/259
[58] Field of Search ............... 260/70 A, 70 M, 28 R, 260/33.4 R, 31.8 R; 428/460, 528, 530, 524; 106/270

[56] References Cited

U.S. PATENT DOCUMENTS

| | | | |
|---|---|---|---|
| 2,678,308 | 5/1954 | Suen | 260/70 A |
| 2,688,604 | 9/1954 | Suen | 260/70 A |
| 2,794,008 | 5/1957 | Ginsler | 260/21 |
| 3,335,191 | 8/1967 | Brack | 260/70 A |

FOREIGN PATENT DOCUMENTS 748913 5/1956 United Kingdom.

OTHER PUBLICATIONS

Blais, Amino Resins, pp. 187–188, Reinhold Publ. Co., N. Y., 1959.

*Primary Examiner*—Melvyn I. Marquis

[57] ABSTRACT

A low viscosity high solids thermosetting coating composition useful in the packaging industry as a barrier coating and overprint varnish, based urea-formaldehyde crosslinking agents and low molecular weight polyols, is provided. These compositions provide rapid cure response and afford coatings having good gloss, clarity, and mar resistance and are non-blocking. The compositions do not contain aromatic solvents and are applicable by gravure or flexographic techniques.

5 Claims, No Drawings

HIGH SOLIDS COATING COMPOSITIONS FOR FLEXIBLE SUBSTRATES CONTAINING UREA-FORMALDEHYDE

BACKGROUND OF THE INVENTION

1. Field of Invention

This invention is related to high solids low viscosity coating compositions and more particularly to coating compositions based on urea-formaldehyde crosslinking agents and low molecular weight polyols.

2. Prior Art

Coatings base on amino resins are well known in the art. In the book "Amino Resins", by J. F. Blais, Reinhold Publishing Co., N.Y., pp. 187-8, 1959, the use of amino resins in conjunction with alkyds is described. The amino resins are considered "in the nature of a modifying supplement" and are usually present as the minor component of the coating compositions.

In U.S. Pat. No. 2,794,008, issued May 28, 1957, to V. W. Ginsler, there are disclosed compositions which contain ester diol plasticizers for aminoplasts. Such compositions can contain up to 95% by weight of aminoplast but rely on the plasticizing effect of the monocarboxylic acid ester moiety for practical utility. The nature of these compositions requires long baking schedules to obtain cured films.

U.S. Pat. No. 2,688,604, issued Sept. 7, 1954, to T. J. Suen, discloses molding compositions based on urea-formaldehyde resins and unsymmetrical diol ethers of glycerol and which can contain as little as 2% by weight the diol ethers. By the nature of the diol ether modifiers, however, one of the hydroxyl groups is secondary and therefore the crosslinking process is relatively slow.

British Pat. No. 748,913, published May 16, 1956, discloses a process for preparing solid urea-formaldehyde foams containing, among others, 10-35% by weight of polyethylene glycol having 3-50 oxyethylene groups. The emulsion systems utilized, however, are not useful as barrier coatings.

SUMMARY OF THE INVENTION

According to the present invention, there is provided a high solids thermosetting coating composition consisting essentially of:

(A) 50-85 parts by weight, based on the weight of (A) plus (B), of a liquid partially or fully alkylated urea-formaldehyde croslinking agent; and (B) 50-15 parts by weight, based on the weight of (A) plus (B), of a liquid polyol having a molecular weight of not more than 1,200, selected from the group consisting of aliphatic diols and triols, ether diols and triols, and polyester diols; wherein components (A) and (B) are compatible and wherein the mixture of (A) and (B) has a maximum Brookfield viscosity of 2,000 centipoises at 25° C.; said composition having a minimum solids content of 80% by weight.

"Consisting essentially of" is intended to have its customary meaning: namely, that all specified materials and conditions are very important in practicing the invention but that unspecified materials and conditions are not excluded so long as they do not prevent the benefits of the invention from being realized.

The coating composition can additionally contain waxes and up to 20% by weight of pigments. Curing can be affected through acid catalysis.

DESCRIPTION OF THE INVENTION

The present invention is directed to high solids compositions which provide glossy coatings upon cure on flexible substrates.

The coating composition of this invention contains about 50-85 parts by weight, and preferably about 70 parts of a nitrogen resin crosslinking agent such as alkylated amine-aldehyde resins, alkylated amide-aldehyde resins or mixtures thereof.

The nitrogen resins, often referred to as alkylated amine-aldehyde resins and alkylated amide-aldehyde resins, are well known. They are the alkylated products of amino-resins prepared by the condensations of at least one aldehyde with at least one of urea, N,N'-ethyleneurea, dicyandiamide, and amino-triazines such as melamines and guanamines. Among the aldehydes that are suitable are formaldehyde, revertible polymers thereof such as paraformaldehyde, acetaldehyde crotonaldehyde, and acrolein. Preferred are formaldehyde and revertible polymers thereof. The amino-resins are alkylated with at least one and up to and including six alkanol molecules containing 1-6 carbon atoms. The alkanols can be straight chain, branched or cyclic.

Among preferred crosslinking agents are partially or fully alkylated urea-formaldehyde products providing a rapid cure. One of the most preferred is a methylated urea-formaldehyde having a Garnder-Holdt viscosity range of Z-2 to Z-5.

For the purposes of this invention it is necessary that the crosslinking agent be a liquid and, in order to avoid extensive dilution of the final coating composition, it is desirable that the crosslinker contain little or no diluent. Furthermore, for a crosslinking agent to be suitable for the purposes of the present invention, it must be compatible with the polyols to be crosslinked.

When all of the above conditions are met, the coating compositions prepared with these crosslinking agents will have a viscosity range suitable for application on flexible substrates. The crosslinking agent is compatible with a polyol if their mixture is a clear solution showing substantially no separation on standing.

The polyol to be utilized in the present coating composition is a diol or triol, is liquid, and has a molecular weight not exceeding 1,200. If one attempted to use polyols of higher molecular weight, their solubility in the crosslinking agent can become limited and the viscosity of the mixture can become excessive. At very low molecular weights, the final cured coatings can be too brittle and can crack and the cure response can be too slow to be useful with certain flexible substrates.

Among the polyols are included simple aliphatic diols, triols, and mixtures thereof, such as ethylene glycol, butylene glycol, cyclohexanedimethanol, trimethylol, propane and the like; ether diols, triols, and mixtures thereof, such as polyethylene glycol, polypropylene glycol, block polymers of ethylene oxide and propylene oxide such as alpha, omega-dihydroxy-poly(oxyethylene)poly(oxypropylene) poly(oxyethylene) having varying block lengths, and the like; and polyester diols such as based on 2,2,4-trimethyl-1,3-pentane diol (TMPD) as the diol component and, as the acid component, an aliphatic dicarboxylic acid of the general formula $HOOC+CH_2)_{\overline{m}}COOH$, where m is generally 2-4, although m = 1 or 4-12 is also possible. In one preferred composition, a mixture of dicarboxylic acids or their esters is utilized, the mixture containing succinic, glutaric, and adipic acids. The choice of a specific ratio of aliphatic esters can depend on the final polyester property desired, such as flexibility. In one preferred composition this ratio is 1:2:1 by weight.

During the prepartion of the polyester, the starting diol component, TMPD, can and probably does react at either of its two hydroxyl groups. Although the polyester is represented by the following formula, it is contemplated that the isomeric product through the secondary hydroxyl groups, can also be present:

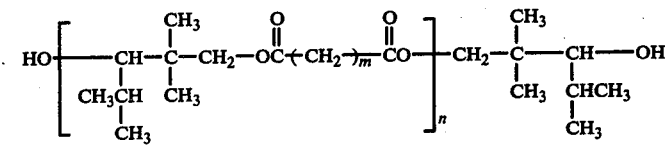

where n = 0-10 and m = 1-12.

For optimum final coating properties it has been found that it is important to control the molecular weight of the polyester diols. The average number average molecular weight must not exceed approximately 1,000. It is of course recognized by the skilled workers, that a polyester itself is a mixture of different molecular weight species, that is, the value of n in the above structure can vary. It is preferred that values of n be 0, 1, 2 or 3, although there are usually obtained smaller amounts of higher molecular weight species also, n up to and including 10. In typical duplicate reactions for the preparation of specific polyesters used in this invention, the following data show the molecular weight species obtained by gel permeation chromatography utilizing a polypropylene glycol standard and the corresponding values on n. For TMPD/aliphatic carboxylic methyl esters (dimethyl succinate:dimethyl glutarate:-dimethyl adipate = 1:2:1, by weight) reactions the molar ratio is 1.8:1.

| Run #1: | | | | | |
|---|---|---|---|---|---|
| molecular weight: | 142 | 230 | 390 | 650 | 950 |
| n: | 0 | (half-ester) | 1 | 2 | 3 |
| Run #2: | | | | | |
| molecular weight: | 143 | 220 | 390 | 640 | 940 |
| n: | 0 | (half-ester) | 1 | 2 | 3 |

It is contemplated that, on the average, at least 65% by weight of this polyester component is n = 3 or less.

For best overall properties for the coating composition of this invention a low final acid number is desired when the polyol is a polyester diol. The acid number is usually 40 or below but it is preferred that the acid number not exceed 12. The acid number is the number of milligrams of potassium hydroxide required to neutralize a 1-gram sample of the polyester.

Among the preferred polyols are the above described block polymer containing 90 weight % propylene oxide having a block molecular weight of 950 and 10% ethylene oxide of a combined molecular weight of 150, polypropylene glycol having a molecular weight of 425, ethylene oxide-propylene oxide polyether of glycerine having a molecular weight of 1,000, and triester of trimethylol propane with epsilon-caprolactone.

The polyol comprises 15-50 parts by weight, and preferably about 30 parts of the coating composition of this invention.

When the polyol and crosslinking agent are combined, the viscosity of the mixture has an important effect on the applicability of the coating composition to flexible substrates. From a standpoint of practicality and in order to avoid applying excessive amounts of coating on the substrate, the poly-crosslinking agent mixture should have a Brookfield viscosity not more than 2,000 centipoises at room temperature and preferably not in excess of 1,500.

The formulated coating composition containing, in addition to the polyol and the crosslinking agent, dissolved wax for increased slip properties, should have a Brookfield viscosity of less than about 1,000 centipoises, preferably about 400-750 centipoises.

In many applications, where the coating composition is used on cellulosic substrates, it is important that the cured coatings have certain slip properties. Such properties are commonly obtained with the addition to the coating composition of waxes such as carnauba wax or microcrystalline waxes. The wax is usually placed in a liquid such as denatured alcohol, milled to obtain a good dispersion of the wax, and then added to the polyol-crosslinking agent mix. The wax is customarily present to the extent of about 2% by weight on coatings solids.

The present coating compositions can be cured with acid catalysts. Among useful catalysts are those used in conjunction with aminoplasts such as para-toluene sulfonic acid, methane sulfonic acid, phosphoric acid, butyl acid phosphate, nonylnaphthalene disulfonic acid, and higher alkyl (up to C-16) acid phosphates.

The catalyst level can usually vary from 1-4% by weight on the solids content and is preferably about 2%.

The compositions of this invention can be applied by any of the appropriate conventional methods. Advantageously, they can be applied by gravure application to flexible substrates such as paper.

Gravure coaters present a sensitive application of coating in terms of matching the surface to be coated with coating composition properties. The surface to be coated is usually of a nature such that the amount of coating transferred from the gravure applicator is between 80% and 90% by weight.

Basically, there are two types of gravure coaters — direct and offset. In the direct method, the coating is transferred immediately from the cells of the gravure cylinder to the substrate. In the offset method, the gravure cylinder is operated against a rubber-covered offset roll. The coating is then transferred to the substrate in the nip formed by a backup roll and the offset roll. In the operation of the offset method, the smooth offset or transfer roll pulls the coating out of the cells of the gravure cylinder by adhesive force thereby splitting the fluid coating film prior to depositing it on the substrate.

When using the high solids relatively high viscosity coating compositions of this invention such a film depositing technique provides a coating having good gloss since there might not be sufficient time for adequate flow prior to cure. Customarily, the viscosity of coatings needs to be lowered by the addition of solvents which often tend to swell the rubber-covered offset roll (or the rubber-covered back-up roll utilized in the direct method) and add to pollution problems. The present coating composition represents an optimum system of high solids content at sufficiently low viscosity to be applicable with either method.

The curing of the coating composition of this invention must be rapid. The substrates, such as paper, utilized in the packaging industry, cannot withstand excessive thermal treatment. On the other hand, the coating must be crosslinked since one step in most packaging operations is a heat sealing step. This requires that the coating applied previously be crosslinked; it cannot be thermoplastic and cannot flow at the heat sealing temperature. The coating composition of this invention meets the requirement of affording a cured coating in 2–10 seconds at 150° C. surface temperature. Preferably, curing occurs in 3–4 seconds. In commercial operations, the curing ovens can reach 290° C. but the substrate travels at approximately 600 feet/minute, in the 20–25 feet long ovens, for a residence time of 2–3 seconds. In such short times, the substrate is not damaged by the heat.

The coating composition of this invention is applicable to a variety of substrates. In general, cellulosics such as paper, paper board, cellophane (xanthated cellulose) can be coated. Additionally, the coating composition finds use on paper which has been pre-coated for good hold-out, polyethylene and polypropylene sheets, plastic films, and metals such as aluminum.

The coating composition of this invention can be utilized in many applications such as overprint varnish to protect printed surfaces from abrasion. It is also useful as a barrier coating, for example, in food packaging where the contents of the package must be protected from external agents, such as pine oil which is a common contaminant in many household goods placed on nearby shelves in the market place. Additionally, the coating composition can act as a gloss coating to upgrade the appearance of the final package.

For most application thin coatings are needed; a coating weight of 100–1000 grams per ream of paper is common.

The properties of the coating composition of this invention are tested by several methods. Slip properties are tested by the Testing Machines Incorporated's Slip and Friction Tester. This tester has a 5 inch by 5 inch platen weighing 2 pounds. A force-measuring gauge is mounted on it. This upper platen has a tacky rubber surface to contact the top specimen and to slide it over the lower sample. The base of the instrument has a clamp to hold the lower specimen. The machine is equipped with two steel rails accurately aligned so that the moving platen will always travel in a straight line. For operation the instrument is leveled and the specimen is clamped to the base with the surface to be tested facing upward. A second specimen is placed on top of it with the surface to be tested facing downward. The upper platen adheres to the top specimen without the requirement for clamps. The pulling speed of the platen is 12 inches per minute. The force necessary to maintain sliding motion is measured by the force gauge mounted on the upper platen. Test results, read from this force gauge, are given as the coefficient of friction. Slip values of 0.2–0.4 are usually required for coatings on substrates utilized in packaging machinery.

Curing of the coating composition is measured by the methyl ethyl ketone rub test as follows: A sample of the coated substrate is laid on a flat surface and rubbed gently with a piece of cheese-cloth folded several times and saturated with the solvent. This test is normally carried to 20 rubs if failure of coating has not occurred. A minimum of five rubs is considered passing for most applications.

Non-blocking of coated substrates is important. The block test is carried out as follows: A sample of the coated substrate is placed face to face with a second sample and an attempt is made to heat-seal the surfaces in a Sentinel Heat Sealer, Model 12 AS with jaws set at 177° C. under 40 pounds pressure for 0.5 second dwell time. Failure of the coating to heat-seal is indicative of a well crosslinked system.

Quality of the appearance of coatings is often measured by their gloss. A 60° angle gloss is measured on a glossmeter utilizing ASTM D-523-67 to test for specular gloss; values between 40 and 80 are acceptable in an overprint varnish.

The invention can be further understood by referring to the following examples in which parts and percentages are by weight unless otherwise indicated.

EXAMPLE 1

Methylated urea-formaldehyde (having a Gardner-Holdt viscosity at room temperature of Z-2 to Z-5, 100% solids, "Resimine" 975, available from the Monsanto Company), 7.0 grams and polypropylene glycol (having a molecular weight of 425), 3.0 grams, are mixed in a suitable container. To this solution is added 0.5 gram of para-toluene sulfonic acid (90% by weight in iso-propanol). The mixture is applied to paper with a number 8 wire-wound rod and the coating is cured in a 150° C. oven for 10 seconds. The coating shows good flow and leveling and is glossy upon cure, passes the block resistance test at 177° C. for 1 second at 40 psi pressure and shows no effects of 20 methyl ethyl ketone rubs.

EXAMPLES 2–5

The procedure of Example 1 is repeated utilizing the same quantities of crosslinking agent and polyols but substituting the following polyols for polypropylene glycol:

Example 2: a polyester diol, prepared as follows: Into a 5 liter three-necked flask equipped with stirrer, thermometer, a packed column, condenser, and a Dean-Stark trap are placed TMPD, 1839.6 g; a mixture of dimethyl succinate, dimethyl glutarate, and dimethyl adipate, in a weight ratio of 1:2:1, 972.0 g; and dibutyltin dilaurate, 3 g. The contents of the vessel are heated to a maximum of 202° C. for a total of 9 hours during which time the theoretical amount of methanol is collected. The final product has a Gardner-Holdt viscosity of Q and a hydroxyl number of 213;

Example 3: an ethylene oxide-propylene oxide polyether of glycerine, having a molecular weight of 1,000, available from Union Carbide as "Niax" LG-168;

Example 4: a 1:2 (by weight) mixture of polypropylene glycol, having a molecular weight of 425 and the triester of trimethylolpropane with epsilon-caprolactone, having a molecular weight of 540, available from Union Carbide as "Niax" PCP-0300; and Example 5: an alpha, omega-dihydroxy-poly(oxyethylene)-poly(oxypropylene)poly(oxyethylene) block copolymer having a molecular weight of 1,100 and having, as its center block, a propylene oxide based segment of molecular weight 950 which approximately 90% of the the copolymer.

Coatings cast and cured as in Example 1 pass all of the tests described in Example 1.

methylol propane with epsilon-caprolactone, and a polyester of the following structure:

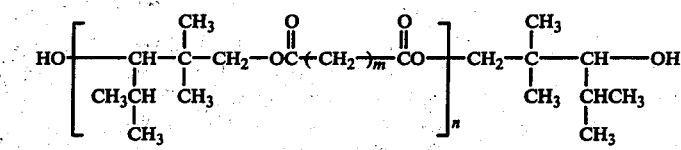

EXAMPLE 6

To a solution of "Resimine" 975, 565.5 grams and the polyol described in Example 1, 242.4 grams, having a Brookfield viscosity, at 25° C., of 1,500 centipoises (12 rpm, number 2 spindle), is added 102.1 grams of a wax dispersion (prepared by milling carnauba wax, 16.5 grams and a microcrystalline wax, 9.0 grams, in denatured alcohol). This composition has 91.6% by weight solids content and has a Brookfield viscosity, at 25° C., of 560 centipoises (6 rpm, number 1 spindle).

The composition is catalyzed with para-toluene sulfonic acid (2 parts by weight on coating solids, dissolved in iso-propanol, 25% by weight solution), cast on paper and cured as described above. The coating has a coefficient of friction of 0.26, a 60° gloss of 60, and passes the block resistance and methyl ethyl ketone rub tests.

What is claimed is:

1. A high solids thermosetting coating composition consisting essentially of:
   (A) 50–85 parts by weight, based on the weight of (A) plus (B), of a methylated urea-formaldehyde crosslinking agent; and
   (B) 50–15 parts by weight, based on the weight of (A) plus (B) of a liquid polyol having a molecular weight range of 425–1,100, selected from the group consisting of aliphatic diols and triols, ether diols and triols, and polyester diols; wherein components (A) and (B) are compatible and wherein the mixture of (A) and (B) has a maximum Brookfield viscosity of 2,000 centipoises at 25° C.; said composition having a minimum solids content of 80% by weight.

2. The coating composition of claim 1, wherein said polyol is selected from the group consisting of polyethylene glycol, polypropylene glycol, block polymer of ethylene oxide and propylene oxide, ethylene oxide-propylene oxide polyether of glycerine, triester of trimethylol propane with epsilon-caprolactone, and a polyester of the following structure:

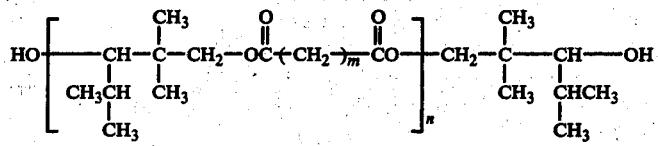

its isomer through the secondary hydroxyl group or mixtures thereof, wherein $n = 0-10$ and at least 65% by weight is $n = 3$ or less and wherein $m = 2-12$.

3. A high solids thermosetting coating composition consisting essentially of:
   (A) 70 parts by weight, based on the weight of (A) plus (B), of a methylated urea-formaldehyde crosslinking agent; and
   (B) 30 parts by weight, based on the weight of (A) plus (B) of a liquid polyol having a molecular weight range of 425–1,100, selected from the group consisting of aliphatic diols and triols, ether diols and triols, and polyester diols; wherein components (A) and (B) are compatible and wherein the mixture of (A) and (B) has a maximum Brookfield viscosity of 2,000 centipoises at 25° C.; said composition having a minimum solids content of 80% by weight.

4. The coating composition of claim 3, wherein said polyol is selected from the group consisting of polyethylene glycol, polypropylene glycol, block polymer of ethylene oxide and propylene oxide, ethylene oxide-propylene oxide polyether of glycerine, triester of trimethylol propane with epsilon-caprolactone, and a polyester of the following structure:

its isomer through the secondary hydroxyl group or mixtures thereof, where $n = 0-10$ and at least 65% by weight is $n = 3$ or less and wherein $m = 2-12$.

5. A high solids thermosetting coating composition consisting essentially of:
   (A) 70 parts by weight, based on the weight of (A) plus (B), of a methylated urea-formaldehyde crosslinking agent; and
   (B) 30 parts by weight, based on the weight of (A) plus (B), of a polypropylene glycol having a molecular weight of 425;
wherein the mixture of (A) and (B) has a maximum Brookfield viscosity of 1,500 centipoises; said composition having a minimum solids content of 80% by weight.

* * * * *